F. C. WASSMAN AND E. KENDALL.
PROTECTIVE DEVICE FOR AUTOMOBILE BATTERIES AND GENERATORS.
APPLICATION FILED SEPT. 17, 1920.
1,428,727.    Patented Sept. 12, 1922.
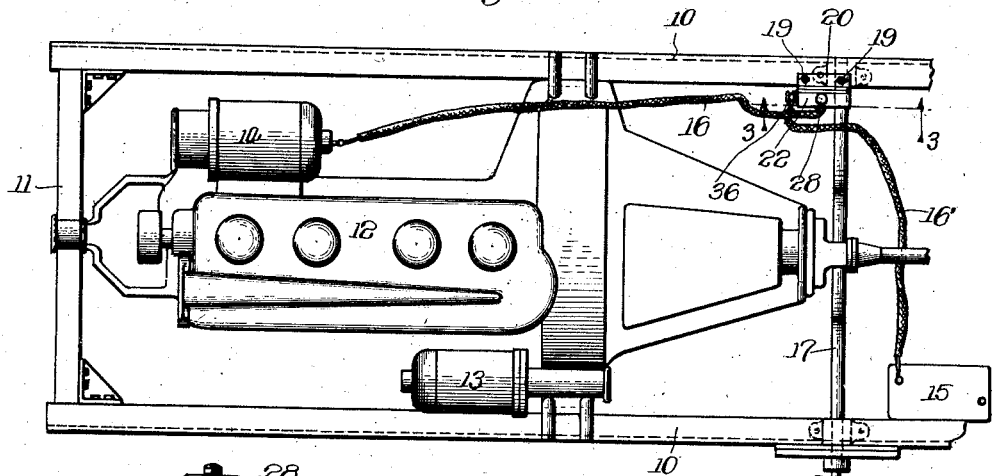
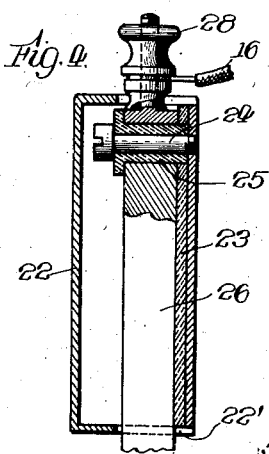
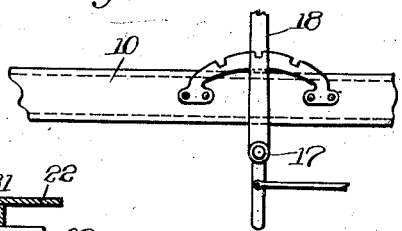
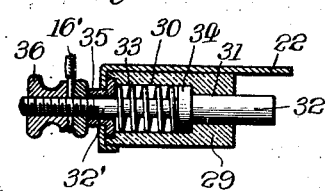
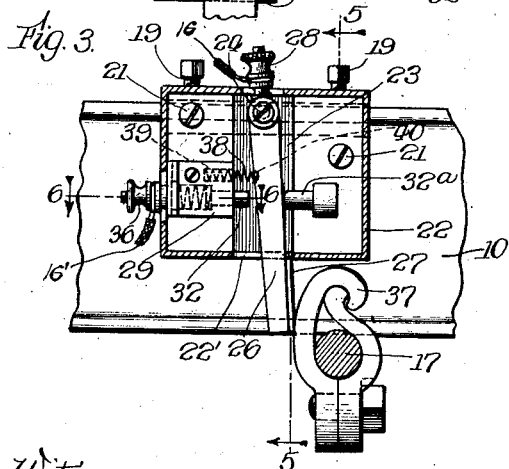
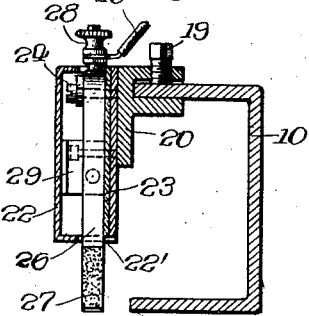
Witness:
T. J. Sauser
Inventors:
Fred C. Wassman,
Earl Kendall,
By Pond & Wilson, Attys.

Patented Sept. 12, 1922.

1,428,727

UNITED STATES PATENT OFFICE.

FRED C. WASSMAN, OF MELROSE PARK, AND EARL KENDALL, OF MAYWOOD, ILLINOIS.

PROTECTIVE DEVICE FOR AUTOMOBILE BATTERIES AND GENERATORS.

Application filed September 17, 1920. Serial No. 411,003.

*To all whom it may concern:*

Be it known that we, FRED C. WASSMAN, a citizen of the United States, residing at Melrose Park, in the county of Cook and State of Illinois, and EARL KENDALL, a citizen of the United States, residing at Maywood, in the county of Cook and State of Illinois, have invented certain new and useful Improvements in Protective Devices for Automobile Batteries and Generators, of which the following is a specification.

Our invention consists of a device designed for use mainly, but not exclusively, on the well-known Ford automobile, for safeguarding the battery and electric generator against injury, due to back flow of the current from the battery to the generator when the latter is idle. It not infrequently happens that when the generator becomes overheated, the automatic cut out on the generator which is designed to prevent back flow of the current from the battery fails to function properly, with the result that the battery is run down and the generator is injured. The purpose or object of our present invention is to provide a simple attachment in the nature of a switch located in the circuit line from the generator to the battery and actuated in one direction by a spring and in the opposite direction by the hand brake lever and controller shaft, whereby, when the car is running the circuit line will be closed, and when the car is stopped the circuit line will be opened by pulling the hand brake lever to or past the vertical position which is always done when the running of the engine is stopped.

Our invention, its mode of operation, and the advantages inherent therein will all be readily understood and appreciated by persons familiar with the automobile art, and particularly Ford cars from the following detailed description, taken in connection with the accompanying drawing wherein we have illustrated a practical and preferred embodiment of our invention, and in which:—

Fig. 1 is a top plan view of a portion of the chassis frame and motor assembly of a Ford car, showing those parts with which our invention immediately co-operates;

Fig. 2 is a fragmentary side elevation of the frame and hand brake lever;

Fig. 3 is an enlarged fragmentary side elevation of one of the side sills of the chassis frame, showing the switch box and switch attached thereto and also the controller shaft and striker arm which operates the switch in one direction;

Fig. 4 is an enlarged vertical transverse section through the switch box, showing the insulation of the pivoted switch arm;

Fig. 5 is a vertical transverse section taken on the line 5—5 of Fig. 3; and

Fig. 6 is an enlarged horizontal transverse section through the slidable contact member, taken on the line 6—6 of Fig. 3;

Referring to the drawing, 10 designates the side sills and 11 the front end sill of the chassis frame; 12 designates the motor, 13 the starter, 14 the generator, 15 the battery, and 16 the circuit line from the generator to the battery. 17 designates the controller shaft journaled transversely of and beneath the side sills 10, and 18 designates the hand brake lever keyed on one end of the shaft 17. These parts, with the exception of the circuit line 16, are all as usual on the Ford car.

To the inner side of one of the sills 10, preferably the right hand sill, is secured by set screws 19 a bracket 20. To this bracket is attached by means of screws 21 a switch box 22. To the inner side of the back wall of the box 22 is secured a strip 23 of fiber board or other insulating material, and in said back wall is secured a pivot stud 24 surrounded by a sleeve 25 of insulating material. On the sleeve 25 is pivotally suspended the switch 26, the lower end of which extends downwardly through a slot 22' in the bottom wall of the switch box 22, and has secured on one side thereof a strip 27 of insulating material. The upper end of the switch 26 carries a binding screw 28 to which is attached one end of the circuit line 16, leading to the generator 14.

Secured to the back wall of the switch box 22 is a block 29 of insulating material formed with a spring chamber 30 and a bore 31 of less diameter than the spring chamber to accommodate a sliding contact member 32. The inner end of the contact member 32 is urged toward the switch 26 by a spring 33 located in the chamber 30 and operating against a collar 34 on the contact member 32, said collar 34 serving to limit the inward movement of the contact member. The outer end of the spring 33 abuts against a sleeve 35 mounted in a side wall of the switch box, and a reduced stem 32' of the contact member 32 extends through the sleeve 35 and carries a binding nut 36 by which the adjacent end of the circuit line 16' leading to the battery 15 is connected to the sliding contact member 32. Secured to the back wall of the switch box on the opposite side of the switch 26 and opposite the sliding contact 32 is a fixed contact 32ª for grounding the generator circuit.

Fast on the controller shaft 17 is a striker arm 37, best shown in Fig. 3, which lies directly opposite the insulated side 27 of the switch 26.

38 designates a compression spring mounted at one end in a pocket 39 formed in the block 29 and at its other end in a pocket 40 in the adjacent side of the switch 26, by which spring the switch 26 is held out of contact with the sliding contact member 32 and in contact with the fixed contact member 32ª when the hand brake lever 18 is vertical or back of the vertical position.

The operation will be readily understood from the foregoing description and may be briefly outlined as follows:

When the car is standing still and the engine is idle, the hand brake lever 18 and the striker arm 37 stand substantially vertical, and in this position the switch 26 is separated from the contact member 32, as shown in Fig. 3, so that the circuit line between the battery 15 and the generator 14 is opened, and the generator circuit is grounded through the fixed contact 32ª and the frame. When the car is started, the hand brake lever 18 is thrown forwardly. This causes the striker arm 37 to force the switch 26 over into contact with the member 32, thereby closing the circuit, and allowing the generator to charge the battery during the running of the car. When the motor is brought to a stop, the hand brake lever 18 is again returned to or past vertical position, to throw the transmission into neutral. This rocks the controller shaft 17 in the opposite direction, and permits the switch 26 to separate from the contact 32 under the push of spring 38, thus opening the circuit line.

From the foregoing it will readily be seen that our invention provides a simple attachment by which when the machine is started and the hand lever 18 is thrown forward, the circuit line to the battery is closed; and when the motor is stopped, and the hand brake lever 18 is returned to or past the vertical position, the circuit line to the battery is at once opened. It will be evident that this device operates to prevent depletion of the battery and possible injury to the generator when the motor is at rest by opening the circuit connecting the battery and generator and making impossible the creation of a closed circuit through the battery and generator when the generator is idle.

Manifestly the details of the switch and switch operating device may be varied from those shown, and the switch may be opened by the striker arm and closed by the spring, if desired without involving any departure from the principle of the invention or sacrificing any of the advantages thereof. Hence, we reserve all such variations and detail modifications as fall within the spirit and purview of the appended claims.

We claim:

1. The combination with the frame, controller shaft, hand brake lever, generator and battery of an automobile, and a circuit line connecting said generator and battery, of a switch in said circuit line mounted on said frame, a spring urging said switch in one direction, and a striker on said controller shaft operating to move said switch in the opposite direction when said brake lever is swung in one direction.

2. The combination with the frame, controller shaft, hand brake lever, generator and battery of an automobile, and a circuit line connecting said generator and battery, of a switch in said circuit line mounted on said frame, a spring tending to open said switch, and a striker on said controller shaft, operating, when said lever is thrown forwardly, to close said switch in opposition to said spring.

FRED C. WASSMAN.
EARL KENDALL.